Figure 1:
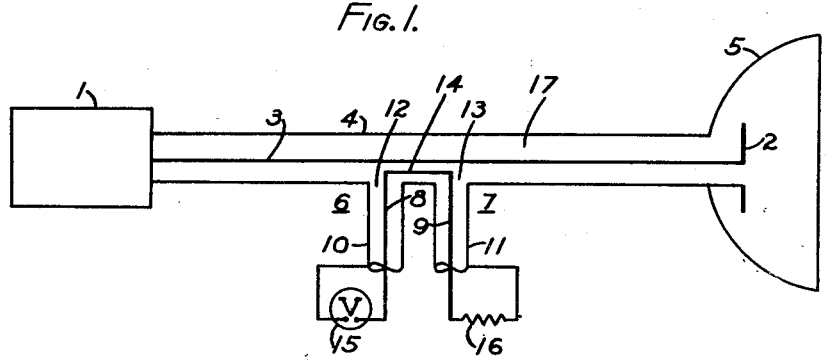

Sept. 19, 1950     R. G. TALPEY     2,523,254
DIRECTIONAL COUPLER
Filed Aug. 14, 1946

INVENTOR.
RICHARD G. TALPEY
BY
J. L. Bowes
ATTORNEY

Patented Sept. 19, 1950

2,523,254

UNITED STATES PATENT OFFICE 2,523,254

DIRECTIONAL COUPLER

Richard G. Talpey, Rochester, N. Y., assignor to Stromberg-Carlson Company, a corporation of New York Application August 14, 1946, Serial No. 690,451

2 Claims. (Cl. 171—95)

This invention relates to directional couplers and more particularly to means for measuring the performance of wave translating devices such as transmission lines, wave guides, and the like.

Wave guides and transmission lines, and particularly coaxial transmission lines, have been used extensively in coupling radio frequency generators to load circuits, such as radiating antennas. If such lines are not correctly terminated, reflected waves travel back from the load or antenna end to the input or source end of the transmission line, the magnitude and phase of the reflected wave depending upon the characteristics of the termination. Means has been proposed heretofore to measure the power transmitted as well as the standing wave ratio and reflection coefficient of wave translating devices.

In order to accomplish these results, it has been proposed heretofore to couple a loop to a transmission line by introducing a loop or probe through one side of the transmission line. The ends of the loop or pickup portion are connected to an auxiliary coaxial line. The auxiliary line is terminated at the sending or input end by the loop and a series resistance. The auxiliary line is terminated at the receiving end by a suitable terminating device, such as a resistor or a monitoring device. With this arrangement, power is coupled into the side or auxiliary line from the main line and the amount of coupled power depends upon the size, shape and orientation of the loop. The incident wave induces an instantaneous current in the loop flowing in one direction. Since capacitance exists between the loop and the translating device, instantaneous current is also induced by the capacitive coupling in phase with the current caused by the inductive coupling.

With respect to the reflected wave, the current in the loop due to inductive coupling from the line is opposite in phase to the current due to the capacitive coupling. If the capacitive and inductive couplings are equal, no current flows in the loop and no power is coupled to the auxiliary lines, so that the monitoring device indicates only power due to the incident wave.

If the loop is then turned 180°, the various relationships are reversed and the power coupled to the auxiliary line comes only from the reflected wave. The ratio of the two voltages or currents as measured at the terminated end of the auxiliary line is the reflection coefficient of the main line. The standing wave ratio can be calculated from the reflection coefficient.

The foregoing type of reflectometer requires mechanical turning of the loop which is a cumbersome method and one susceptible to error.

Accordingly, it is an object of my invention to provide a new and improved device which separates the incident and reflected waves in a wave translating device and which enables direct reading to be made of the incident and reflection coefficients thereof.

It is another object of my invention to provide a new and improved reflectometer or directional coupler in which no mechanical movement or rotation of the loop is required.

Figure 2:
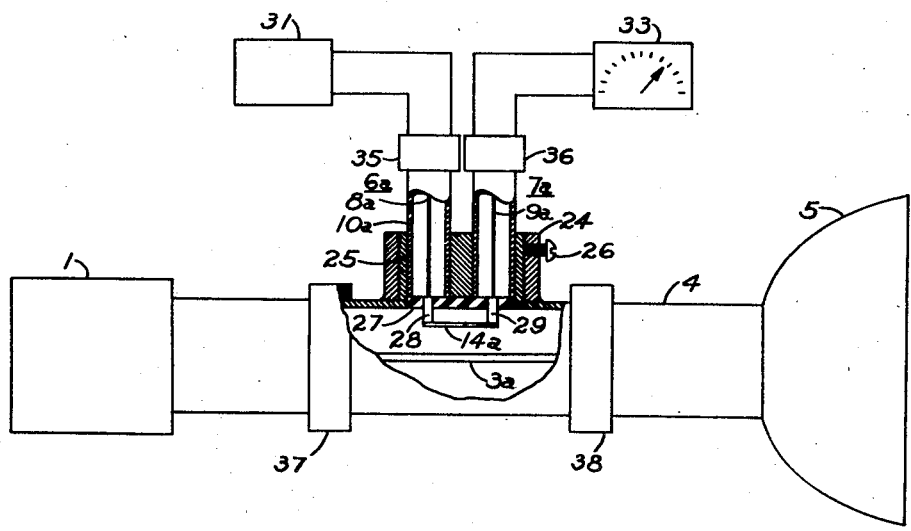

The principles of my invention will best be understood from a study of the following specification when read in connection with the accompanying drawing, in which Fig. 1 is a schematic representation illustrating the principles of my invention and Fig. 2 illustrates details of one embodiment of my invention.

Referring to Fig. 1, there is indicated by the numeral 1 a suitable transmitter including a high frequency oscillator arranged to feed a suitable antenna, such as a radiating dipole 2 by means of a transmission line of the coaxial type comprising concentric coaxially disposed inner and outer conductors 3 and 4, respectively. The transmission line is suitably matched to the antenna load and the dipole 2 is located at the focus of a parabolic reflector 5.

In order to enable monitoring of the energy fed to the antenna, I have provided monitoring means comprising, in this embodiment of my invention, a pair of auxiliary coaxial lines 6 and 7, comprising inner and outer conductors 8, 9, and 10, 11, respectively. For purposes of support, the outer conductors 10 and 11 of the auxiliary lines are suitably joined to the outer conductor 4 opposite openings 12 and 13, respectively, in the outer conductor 4. The inner conductors 8 and 9 are suitably joined by a loop or connecting member 14 inside the outer connector 4 of the main transmission line. The outer conductors are electrically connected, as through connections to the outer conductor 4 in the embodiment shown in Fig. 1.

The auxiliary lines 6 and 7 are suitably terminated in their characteristic impedances, as by means of a suitable voltmeter 15 and a terminating device such as resistor 16, respectively. For instance, if auxiliary line 7 is terminated by a resistance and the voltage at the end of auxiliary line 6 is read by means of voltmeter 15 of suitable characteristics, a voltage proportional to the incident wave is read. If auxiliary line 6 is then terminated by the resistance 16, and the auxiliary line 7 by the voltmeter 15, a voltage proportional to the reflected wave is monitored.

In order to regulate the amount of power picked up by the loop, the loop 14 may be made adjustable toward and away from the inner conductor 3, and the orientation of the loop 14 and inner conductor 3 may be adjustable. The amount of pickup is also dependent upon the area and shape of the loop or pickup portion 14. The inductive coupling between the inner line 3 and the pickup portion 14 varies with distance from the center conductor as well as the area and shape of the loop. The maximum inductive coupling for a given distance from the inner conductor 3 and a given area of loop is obtained when the longitudinal axis of the pickup portion is parallel to the inner conductor 3. The capacitive coupling between conductor 3 and loop 14 is indicated by the dotted representation 17 of a capacitor. The angular orientation of the axis of the pickup portion 14 in a plane parallel to the inner conductor 3 has substantially no effect on the capacitive coupling provided the dimensions of the pickup portion are small relative to the dimensions of the main line.

As indicated in Fig. 1, the auxiliary transmission lines are spaced apart but the spacing may be as small as desired subject to the limitation that the size of the pickup portion appreciably affects the amount of pickup.

In adjusting the reflectometer or monitoring means for use, the portion 14 is disposed in a position in which the capacitive coupling is substantially equal to the inductive coupling. Thereafter, the pickup portion 14 need not be rotated or moved from one position to another. In order to obtain comparative data on the incident and reflected waves, the terminating resistance 16 and the meter 15 are interchanged. When the induced currents are in phase, the induced voltages add and when the induced voltages are 180° out of phase, the voltages subtract. The voltages caused by the capacitive coupling are in the same direction, but the voltages resulting from the inductive coupling are reversed because of the reversed flow of power in the line. Thus, if the inductive and capacitive coupling are equal, cancellation will result for power flow in one direction between the transmitter 1 and the antenna 2.

If two suitable monitoring devices are available, the terminating device such as resistance 16 may be eliminated, a second monitoring device being substituted for the resistance and readings taken together and the standing wave ratio calculated. If desired, a comparision circuit may be used to determine the standing wave ratio directly.

In Fig. 2, there is represented a suitable mechanical construction of a reflectometer embodying the principles of my invention. The apparatus shown in Fig. 2 includes a section of coaxial line which is insertable into the main line to be measured and comprises inner conductor 3a and outer conductor 4a suitably coupled to the main transmission line by suitable coupling mechanism represented by the numerals 37 and 38. The outer conductor 4a is provided with a suitable opening 23 in a side thereof. A suitable mounting member 24 which is preferably of cylindrical cross-section is suitably attached surrounding the opening as by means of solder or welding for example. The auxiliary lines 6a and 7a pass through suitable openings in a plug 25 of brass or the like which is held in the desired position with respect to the opening 23 in any suitable manner, such as by means of set screw 26. The opening 23 is closed by an insulating disc 27 having suitable electrically conductive inserts 28 and 29 corresponding in position to the inner connectors 8a and 9a of auxiliary lines 6a and 7a. The insert 28 and inner conductor 8a are electrically connected and insert 29 and inner connector 9a are similarly electrically connected. The pickup portion or connecting member 14a is secured at its ends to the opposite sides of inserts 28 and 29.

In the above described arrangement, the pickup portion 14a may be rotated or moved toward or away from the inner conductor 3a if desired for adjustment purposes. If the inherent capacitive coupling between pickup portion 14a and conductor 3a is insufficient, additional coupling can be provided by changing the shape of the loop. There is indicated by the numeral 31 a suitable terminating resistance and by the numeral 32 an indicating or monitoring device. In order to make ready connection to either auxiliary lines 8a or 9a, there are provided suitable coupling devices 35 and 36.

From the foregoing description, it is understood that the principles of my invention can be permanently included in a transmission line or may be assembled as a complete test instrument including a section of transmission line to be inserted at a suitable point in the main transmission line upon which measurements are to be taken. There is also provided a simple arrangement for measuring both incident and reflected waves which minimizes errors which might otherwise occur by varying the position of the pickup portion 14 or 14a with respect to the inner conductor of the transmission line.

While I have shown and described a particular embodiment of my invention, it will be obvious to those skilled in the art that changes and modifications may be made without departing from my invention in its broader aspects. For example, any arrangement in which the inner conductors of a main transmission line and an auxiliary transmission line are in inductive and capacitive coupling relationship can be employed. Moreover, it is not necessary to employ two auxiliary coaxial lines inasmuch as a doubled back line may be used, and sections of the outer conductors of both main and auxiliary lines removed to permit coupling between portions of the inner conductors. If a single auxiliary line is used and a portion of the outer conductor removed, the resulting branches of the auxiliary line are equivalent to two auxiliary lines. I, therefore, aim in the appended claims to cover all such changes and modifications as fall within the true spirit and scope of my invention.

What I claim is:

1. Test apparatus for measuring the performance of a transmission line of the coaxial type having coaxially disposed inner and outer conductors comprising a test section comprising a length of coaxial line, couplings provided at either end of said section whereby said test section is insertable into said transmission line, the inner conductor of said test section being an extension of the inner conductor of said transmission line and the outer conductor of said test section being an extension of the outer conductor of said transmission line when said section is inserted into said transmission line, said section having an opening through a side thereof, an insulating closure mean for closing said opening, a pair of electrically conductive members extending through said closure means and joined by an electrically conductive member within said insertable section to complete a coupling loop disposed in inductive and capacitive coupling relation with respect to the inner conductor of said test section, a pair of auxiliary coaxial lines each having an inner conductor and an outer conductor, the outer conductors of said auxiliary line being connected to the outer conductor of said test section and the inner conductors of said auxiliar line being connected respectively to the outer ends of said pair of conducting members, means for terminating said auxiliary lines externally of said auxiliary lines, at least one of said terminating means including a monitoring device, and means for removably coupling said terminating means to said auxiliary lines.

2. Test apparatus for measuring the performance of a transmission line of the coaxial type having coaxially disposed inner and outer conductors comprising a test section comprising a length of coaxial line, couplings provided at either end of said section whereby said test section is insertable into said transmission line, the inner conductor of said test section being an extension of the inner conductor of said transmission line and the outer conductor of said test section being an extension of the outer conductor of said transmission line when said section is inserted into said transmission line, said section having an opening through a side thereof, an insulating closure means for closing said opening, a pair of electrically conductive members extending through said closure means and joined by an electrically conductive member within said insertable section to complete a coupling loop disposed in inductive and capacitive coupling relation with respect to the inner conductor of said test section, a pair of auxiliary coaxial lines each having an inner conductor and an outer conductor, the outer conductors of said auxiliary line being connected to the outer conductor of said test section and the inner conductors of said auxiliary line being connected respectively to the outer ends of said pair of conducting members, means for terminating said auxiliary lines externally of said auxiliary lines, at least one of said terminating means including a monitoring device, means for removably coupling said terminal means to said auxiliary lines, and means for adjusting the degree of coupling between said inner conductor of said test section and said coupling loop.

RICHARD G. TALPEY.

REFERENCES CITED

The following references are of record in the file of this patent:

UNITED STATES PATENTS

| Number | Name | Date |
|---|---|---|
| 2,311,520 | Clifford | Feb. 16, 1943 |
| 2,423,390 | Korman | July 1, 1947 |
| 2,423,416 | Sontheimer | July 1, 1947 |

OTHER REFERENCES

Wireless Engineering, August 1943, pp. 365–367. (Copy in Division 51.)